United States Patent [19]

Hayashi et al.

[11] Patent Number: 5,794,255
[45] Date of Patent: Aug. 11, 1998

[54] PROCESSING APPARATUS AND METHOD OF MOVING VIRTUAL STORAGE RESOURCES BETWEEN DISK UNITS

[75] Inventors: Kichizou Hayashi; Ayako Tamaki, both of Kawasaki, Japan

[73] Assignee: Fujitsu Limited, Kawasaki, Japan

[21] Appl. No.: 621,895

[22] Filed: Mar. 26, 1996

Related U.S. Application Data

[63] Continuation of Ser. No. 275,361, Jul. 15, 1994, abandoned.

[30] Foreign Application Priority Data

Nov. 16, 1993 [JP] Japan .................................. 5-285455

[51] Int. Cl.⁶ .................................................. G06F 17/30
[52] U.S. Cl. ........................... 707/205; 707/204; 711/118
[58] Field of Search ................................ 395/600, 441, 395/182.14, 700; 707/205, 204; 711/118

[56] References Cited

U.S. PATENT DOCUMENTS

| | | | |
|---|---|---|---|
| 4,298,932 | 11/1981 | Sams | 364/200 |
| 4,310,883 | 1/1982 | Clifton et al. | 364/200 |
| 4,467,421 | 8/1984 | White | 364/200 |
| 4,528,624 | 7/1985 | Kamionka et al. | 364/200 |
| 4,606,003 | 8/1986 | Daniels | 364/200 |
| 4,625,273 | 11/1986 | Woffinden et al. | 364/200 |
| 5,072,378 | 12/1991 | Manka | 395/575 |
| 5,155,845 | 10/1992 | Beal et al. | 395/575 |
| 5,276,860 | 1/1994 | Fortier et al. | 395/575 |
| 5,276,867 | 1/1994 | Kenley et al. | 395/600 |
| 5,363,487 | 11/1994 | Willman et al. | 395/275 |
| 5,386,516 | 1/1995 | Monahan et al. | 395/275 |
| 5,386,566 | 1/1995 | Hamanaka et al. | 395/700 |
| 5,537,534 | 7/1996 | Voigt et al. | 395/182.04 |
| 5,542,065 | 7/1996 | Burkes et al. | 395/441 |
| 5,546,558 | 8/1996 | Jacobson et al. | 395/441 |
| 5,581,724 | 12/1996 | Belsan et al. | 395/441 |

*Primary Examiner*—Thomas G. Black
*Assistant Examiner*—Cheryl R. Lewis
*Attorney, Agent, or Firm*—Staas & Halsey

[57] ABSTRACT

Volume-unit transfer of information from a small-capacity disk unit to a larger-capacity disk unit is achieved to permit utilization of information including the increment capacity brought about by the transfer as virtual storage resources. The move processing comprises checking the track capacities, from among attribute information, of the source disk unit and the destination disk unit, and when these capacities are determined to be in agreement with each other, copying the volume contents of virtual storage resources of the source disk unit to the destination disk unit. After copying, the space map of the catalog section controlling the number of tracks copied to the destination is rewritten in compliance with the number of tracks of the volume capacity of the destination.

10 Claims, 7 Drawing Sheets

PROCESSING APPARATUS AND METHOD OF MOVING VIRTUAL STORAGE RESOURCES BETWEEN DISK UNITS

This application is a continuation, of application Ser. No. 08/275,361, filed Jul. 15, 1994, now abandoned.

BACKGROUND OF THE INVENTION

1. Field of the Invention

The present invention relates to a processing apparatus and a method of moving virtual storage resources, which moves the contents of a volume stored in accordance with the virtual storage access method to an added disk unit having a larger capacity, and more particularly, to a processing apparatus and a method of moving virtual storage resources, in which movement of virtual storage resources is accomplished with a volume of the disk unit as a unit.

2. Description of the Related Art

There is recently an increasing social demand for more information-oriented activities based on computers, and support of storage medium storing information in a huge volume in a computer system is rapidly changing the general status. As external storage units for a computer system, it is the usual practice to use input/output subsystems using magnetic disk units known as direct access storage device. With the progress of the informational society, magnetic disk units are directed toward a larger capacity, a higher performance and saving of resources. For the achievement of such larger-scaled input/output subsystems using disk units, the entire contents of volumes stored in the existing disk units are transferred to a newly installed larger-capacity disk unit, in which case, it is necessary to reduce man-hours and costs. The entire contents of storage of a disk unit as referred to herein is defined to as a volume. The words volume contents shall therefore mean the stored contents of that entire disk unit. There is another unit of storage known as a file, and a single volume is composed of a plurality of files.

When installing new larger-capacity disk units in place of existing disk units, the conventional practice is to transfer information with a volume as a unit if information resources according to the virtual storage access method (hereinafter referred to as "virtual storage resources") are not stored. The transfer with a volume as a unit is a manner of processing of moving information for each physical track as a unit, without being conscious of a plurality of files contained in the volume. However, if virtual storage resources are stored, it is impossible to conduct transfer with a volume as a unit, but transfer is carried out with the plurality of files contained in the volume as a unit.

More specifically, in FIG. 1, a volume of a disk unit storing the virtual storage resources entrusts a catalog section 48 provided following a volume table of contents (VTOC) 46 for the management of VSAM files stored in a data section 52, as shown by a disk unit 22. The catalog section 48 stores a space map 50 which controls the number of tracks T1 to Tn which form the volume contents. When the capacity of physical tracks differs between the source disk unit 22 and a destination disk unit 24, the space map 50 of the catalog section 48 produces a contradiction at the destination. When moving a volume from the disk unit 22 having a capacity of 630 MB to the disk unit 24 having a twice as large capacity of 1,260 MB, for example, the volume capacity of A1 (tracks T1 to Tn) before the move, increases to a volume capacity of A1+A2 (tracks T1 to Tn+m) after the move. However, the space map 60 provided in the catalog section 58 after the move can be controlled only to the volume capacity A1 (tracks T1 to Tn) according to the space map 50 at the source as defined first above, i.e., only to 630 MB. As a result, it is impossible to access the tracks Tn+1 to Tn+m contained in the area A2 which is in excess of the volume capacity A1 in the disk unit 24 after the move. When the virtual storage resources are stored, therefore, files are moved one by one with a file as a unit after defining a new space map 60.

For the transfer with a file as a unit, however, it is necessary to repeat start and stop of transfer in a number equal to the number of files contained in that volume. As compared with volume-unit transfer which permits transfer of all the tracks with a single start, this file-unit transfer requires more manhours and time for the transfer operation, tends to cause operator's mistakes, and makes it more complicated to increase the capacity of the input/output subsystem.

SUMMARY OF THE INVENTION

According to the present invention, there is provided an apparatus and a method of moving virtual storage resources between disk units which permits volume-unit transfer from a small-capacity disk unit to a larger-capacity disk unit even for a volume containing virtual storage resources and utilization of all the contents of storage including that corresponding to the capacity increment resulting from the transfer as virtual storage resources.

A typical equipment configuration is as follows. The apparatus of the present invention comprises a first disk unit which is the source of transfer, a second disk unit which is the destination of transfer, an attribute check section, a volume copying section, and a catalog modifying section. The first disk unit which is the source of transfer stores a virtual storage resource. The virtual storage resource stores files to be subjected to virtual storage access from a higher-level device in a data section of the disk unit, and is provided with a space map which controls the number of tracks in a catalog section of the volume table of contents controlling these files. A disk unit having a volume capacity larger than, and a track capacity equal to, those of the source disk unit is employed as the destination disk unit. The attribute check section checks the track capacities from among attribute information of the source disk unit and the destination disk unit, and determines whether or not these capacities are in agreement with each other. When agreement of the track capacities is determined by the attribute check section, the volume copying section copies the volume of the source disk unit directly into the destination disk unit.

More specifically, this copying of the volume is accomplished with a track as a unit. After the completion of copying by the volume copying section, the catalog modifying section rewrites the space map copied into the destination to the volume capacity of the destination. The attribute check section, the volume copying section and the catalog modifying section are achieved as functions of a command to move the volume, issued by the operating system of a higher-level device. An operand of this command to move the volume specifies the volume serial number and the name of the source catalog of the source disk unit, and the volume serial number and the name of the catalog of the destination disk unit.

The method of processing of the present invention comprises the following steps:

I. Instruction step of processing:

The source disk unit instructs volume-unit transfer to the destination disk unit having a larger capacity.

II. Attribute checking step:

The track capacity from among the pieces of attribute information of the source disk unit and the track capacity from among the pieces of attribute information of the destination disk unit are compared to determine whether or not they are in agreement.

III. Volume copying step:

When agreement of the track capacities has been determined, the volume of the source disk unit is directly copied into the destination disk unit.

IV. Catalog modifying step:

After the completion of copying of the volume, the space map of the source catalog section copied into the destination is rewritten into the destination volume capacity.

According to such an apparatus and a method of moving virtual storage resources of the present invention, it is possible to accomplish volume-unit transfer from a small-capacity disk unit to a larger-capacity disk unit, in the same manner as in an ordinary file, even when the contents of a volume are virtual storage resources having files under control of a catalog section in compliance with the virtual storage access method. It is also made possible to utilize the volume including the increment area at the destination by rewriting the space map corresponding to the track capacity at the source into the space map corresponding to the track capacity at the destination, after dead-copying the volume contents of the virtual storage resource with a volume as a unit.

The above and other objects, features, and advantages of the present invention will become more apparent from the following detailed description with reference to the drawings.

DETAILED DESCRIPTION OF THE PREFERRED EMBODIMENTS

Figure 2:
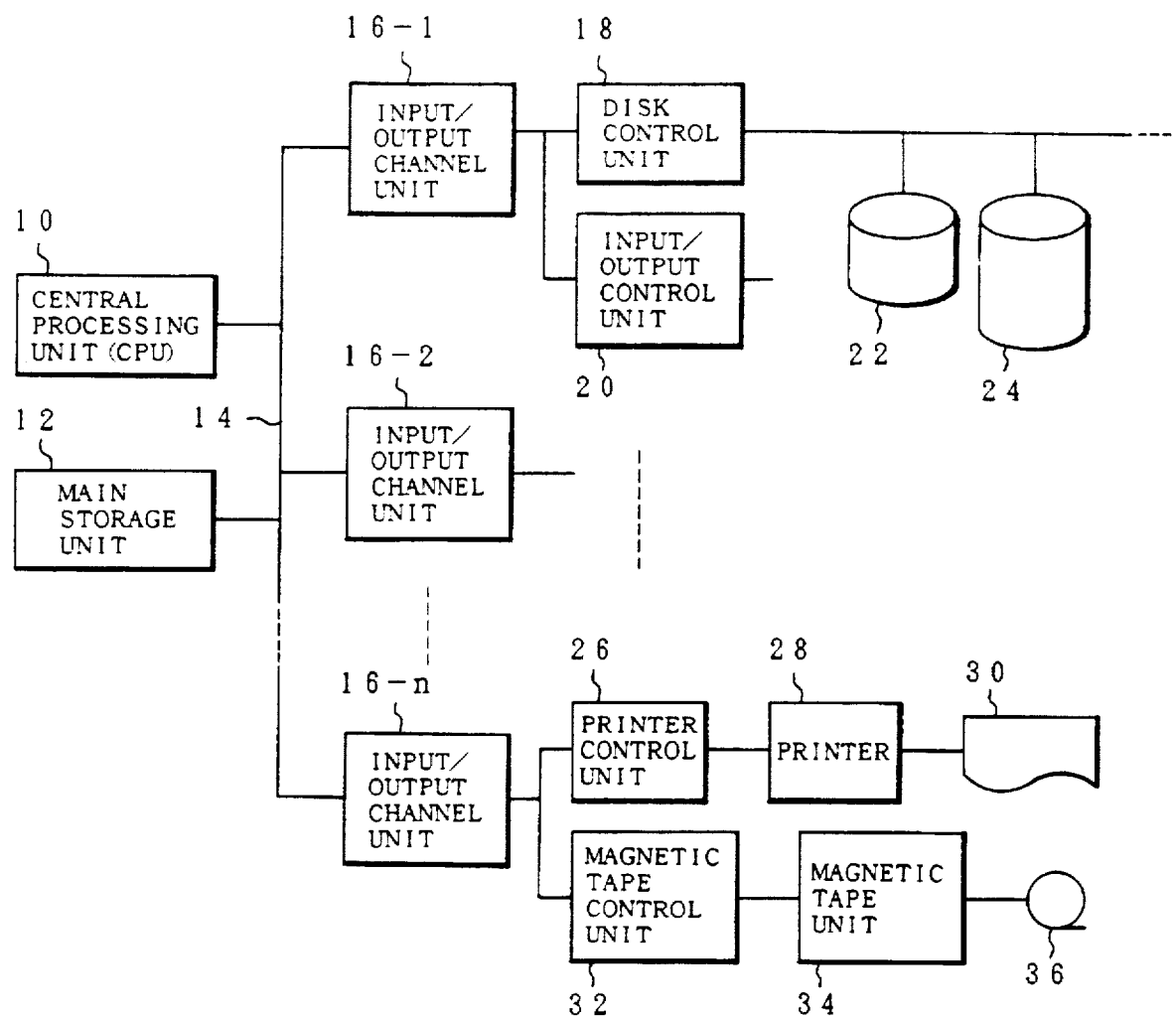
FIG. 2 is a block diagram of a computer system to which the present invention is applicable.

In the computer system shown in FIG. 2, a main storage unit 12 is connected to a bus 14 of a central processing unit (CPU) 10. An operating system and various user programs are stored in the main storage unit 12. The central processing unit 10 performs various processing and control operations while utilizing corresponding functions of the operating system in the execution of a user program. In this computer system, the virtual storage method is adopted for storage of information resources. Access to an input/output subsystem would therefore be conducted in accordance with the virtual storage access method. A plurality of input/output channel units 16-1 to 16-n are connected to the bus 14 of the central processing unit 10. Disk units 22 and 24 are connected through a disk controller 18 to the input/output channel unit 16-1. An input/output controller 20 is provided for the other input/output units. In addition, in this embodiment, a printer controller 26 and a magnetic tape controller 32 are connected to the input/output channel unit 16-n. A printer 28 is connected under control of the printer controller 26 to permit printout of appropriate information on a printing paper 30. A magnetic tape unit 34 is connected under control of the magnetic tape controller 32, and performs information storage using a magnetic tape medium 36. Of the two disk units 22 and 24 connected to the disk controller 18, the disk unit 22 is an existing unit having a small capacity. The disk unit 24 is in contrast a disk unit having a large capacity, newly installed for increasing the capacity of the input/output subsystem. Upon installation of this new larger-capacity disk unit 24, transfer operation of moving the contents of the volume of the existing small-capacity disk unit 22 to the new disk unit 24 is performed in accordance with the transfer processing of the present invention.

Figure 3:
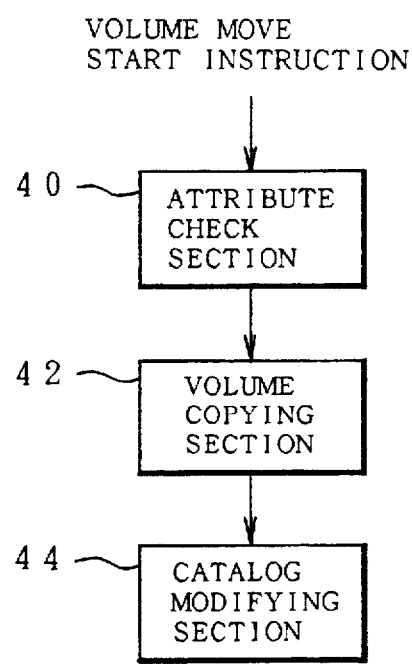
FIG. 3 is a functional block diagram of the present invention.

FIG. 3 shows the transferring function of the present invention, as achieved as one of the processing functions of the operating system in the central processing unit 10 in FIG. 2. For the purpose of moving virtual storage resources, three functions are provided, including an attribute check section 40, a volume copying section 42 and a catalog modifying section 44. These three functions are provided as volume moving commands in the operating system. The volume moving command is started by an instruction from the operator, for example, and executes transfer processing of the volume contents from the small-capacity source disk unit having a virtual storage resource to the larger-capacity destination disk unit.

Figure 4:
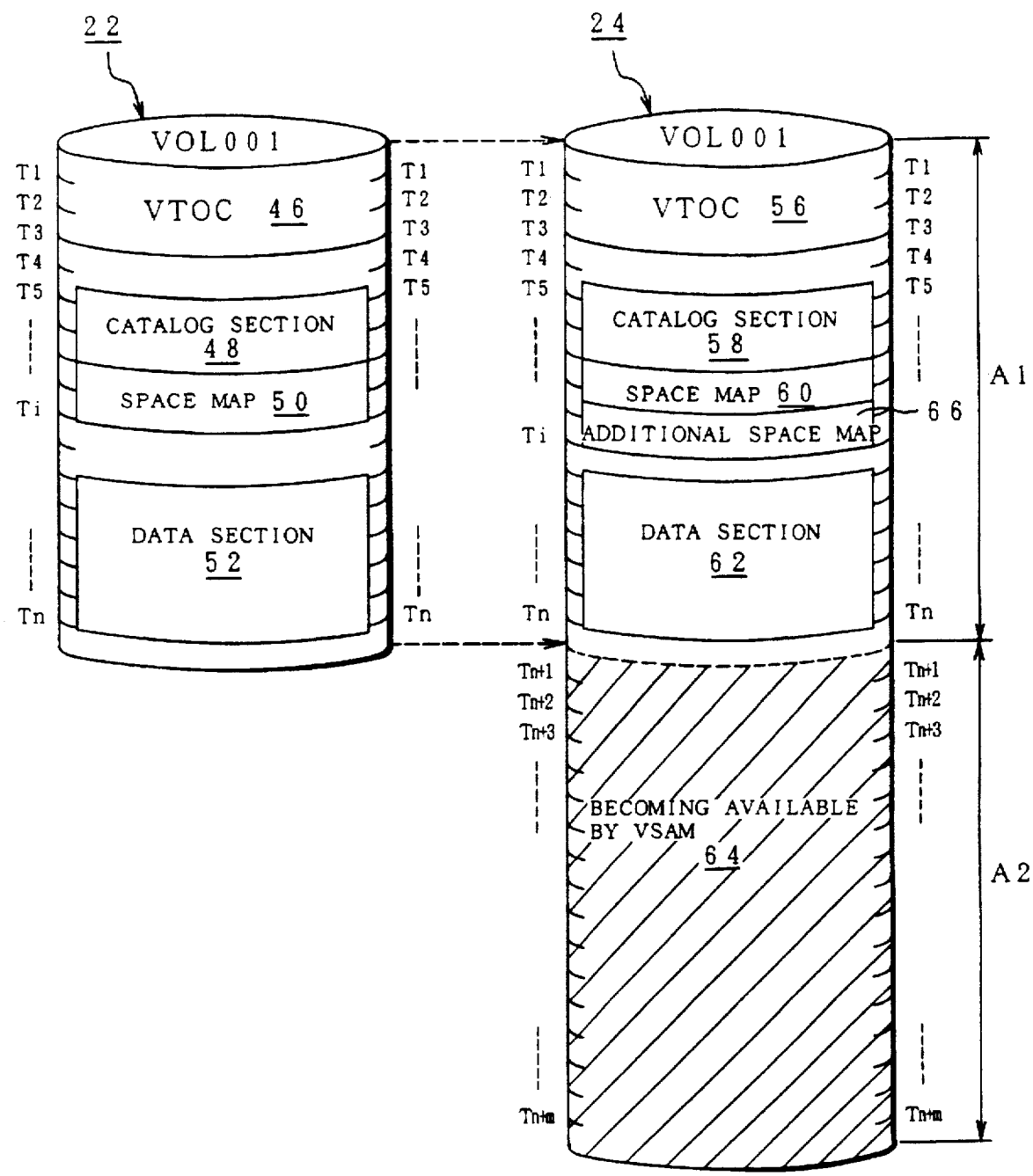
FIG. 4 is a descriptive view of source and destination disk units covered by the present invention.

FIG. 4 shows the volume contents of the source disk unit and the destination disk unit covered by transfer processing of the present invention. The source disk unit 22 has, for example, a volume capacity of 630 MB, and is composed of tracks T1 to Tn. The destination disk unit 24 has in contrast a twice as large volume capacity of 1,260 MB, i.e., the disk unit 24 has an increment area A2 provided with tracks Tn+1 to Tn+m, in addition of the area A1 containing T1 to Tn represented by the same reference numerals corresponding to the tracks T1 to Tn of the source disk unit 22. The source disk unit 22 stores a virtual storage resource according to the virtual storage access method of the operating system to be executed by the central processing unit 10. More specifically, the tracks T1 to T3 are used for a volume table of contents 46, and a catalog section 48 is provided in each of the following tracks T4 to Ti. A space map 50 is provided in the catalog section 48. Furthermore, the remaining track area is used as a data section 52 which in turn stores one or more files. The files stored in the data section 52 are under control of the catalog section 48. The space map 50 provided in the catalog section 48 controls the number of tracks T1 to Tn available as the volume for the disk unit 22. The space map 50 is composed, for example, of bit maps one-to-one corresponding to the tracks T1 to Tn. These bit maps are utilized for setting data write status, empty status, update status or access effective area of each track by setting or resetting bits.

The destination disk unit 24 is shown in a state in which the volume contents of the source disk unit 22 have been transferred. Volume-unit transfer processing from the source disk unit 22 to the destination disk unit 24 is accomplished by the following functions of the attribute check section 40, the volume copying section 42 and the catalog modifying section 44 shown in FIG. 2. Upon receipt of a start instruction to move the volume issued by an operation of the operator, the attribute check section 44 first compares physical attribute information between the source disk unit 22 and the destination disk unit 24 to check if move is possible. More specifically, the attribute check section 44 checks up whether or not there is agreement of track capacity between the source disk unit 22 and the destination disk unit 24. If there is agreement of the track capacity, the attribute check section 44 passes, determining that transfer is possible, processing to the volume copying section 42. The volume copying section 42 makes a dead copy of the volume contents of the source disk unit 22 into the destination disk unit 24. More specifically, the volume copying section 42 executes a track-unit dead copy sequentially from the tracks T1 to Tn of the source disk unit 22. Upon completion of the processing by the volume copying section 42, it passes processing to the catalog modifying section 44. The catalog modifying section 44 modifies a space map 60 of the destination disk unit 24 for which copying has been completed. That is, with dead copy of the volume contents of the source disk unit 22, the space map 60 has the same contents as in the source space map 50, and in this state, only the area A1 of the tracks T1 to Tn is controllable. Therefore, the catalog modifying section 44 prepares an additional space map 66 for the increment area A2 of the remaining tracks Tn+1 to Tn+m, and performs modification processing of rewriting. As a result of this addition of the additional space map 66 to the space map 60, all the tracks T1 to Tn+m would be covered by the new space map of the destination disk unit 24. The area made by adding the increment area A2 to the original data section 62 is thus made available as a new file area.

Figure 5:
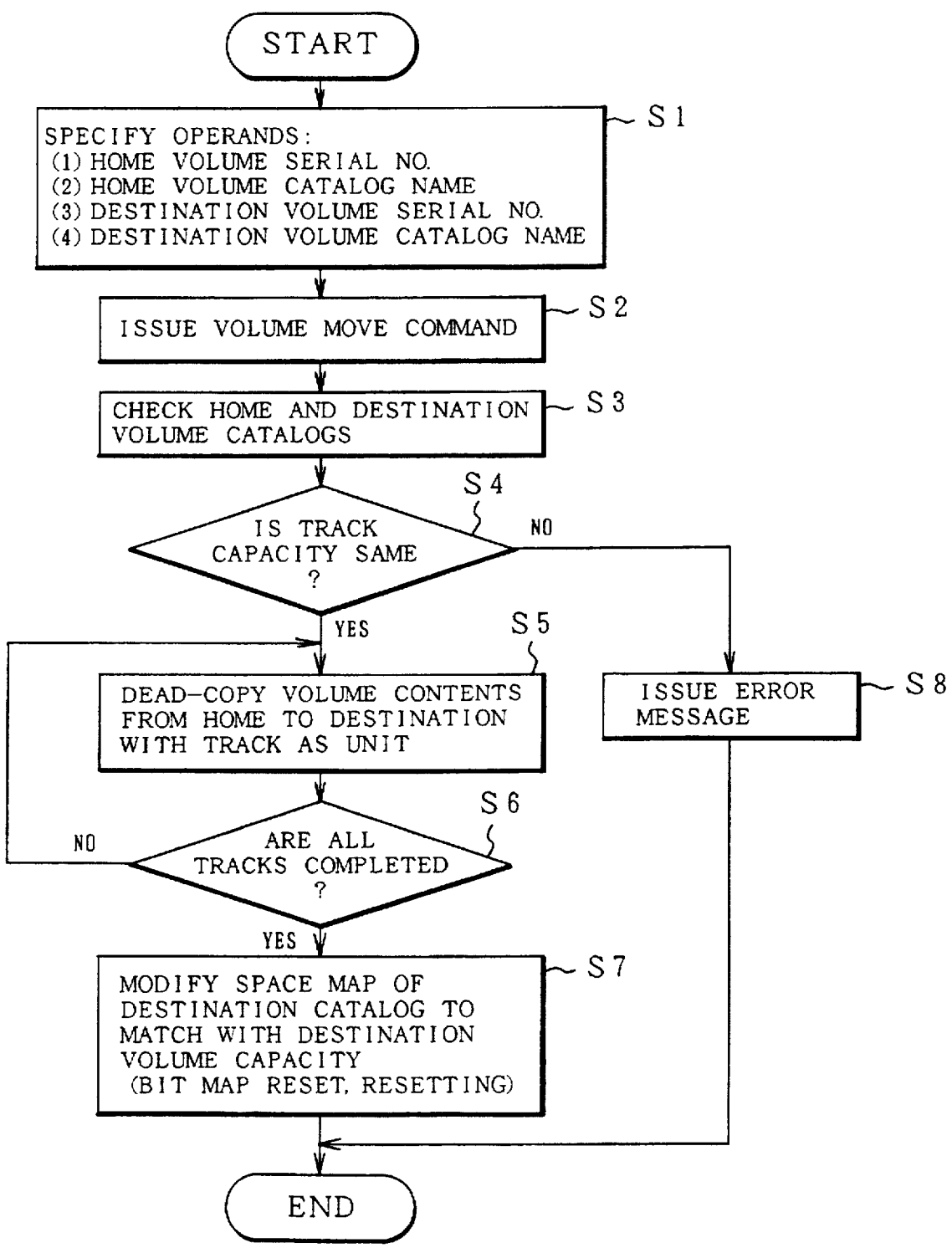
FIG. 5 is a flowchart of processing operations in the present invention.

The flowchart of FIG. 5 shows the transfer processing of the present invention, which is accomplished as a processing routine of the volume move command of the operating system. First, at the step S1, through interaction with the operator, the operator is caused to specify the following operands of the volume move command:

I. Source volume serial number;

II. Source volume catalog name;

III. Destination volume serial number;

IV. Destination volume catalog name.

Figure 6:
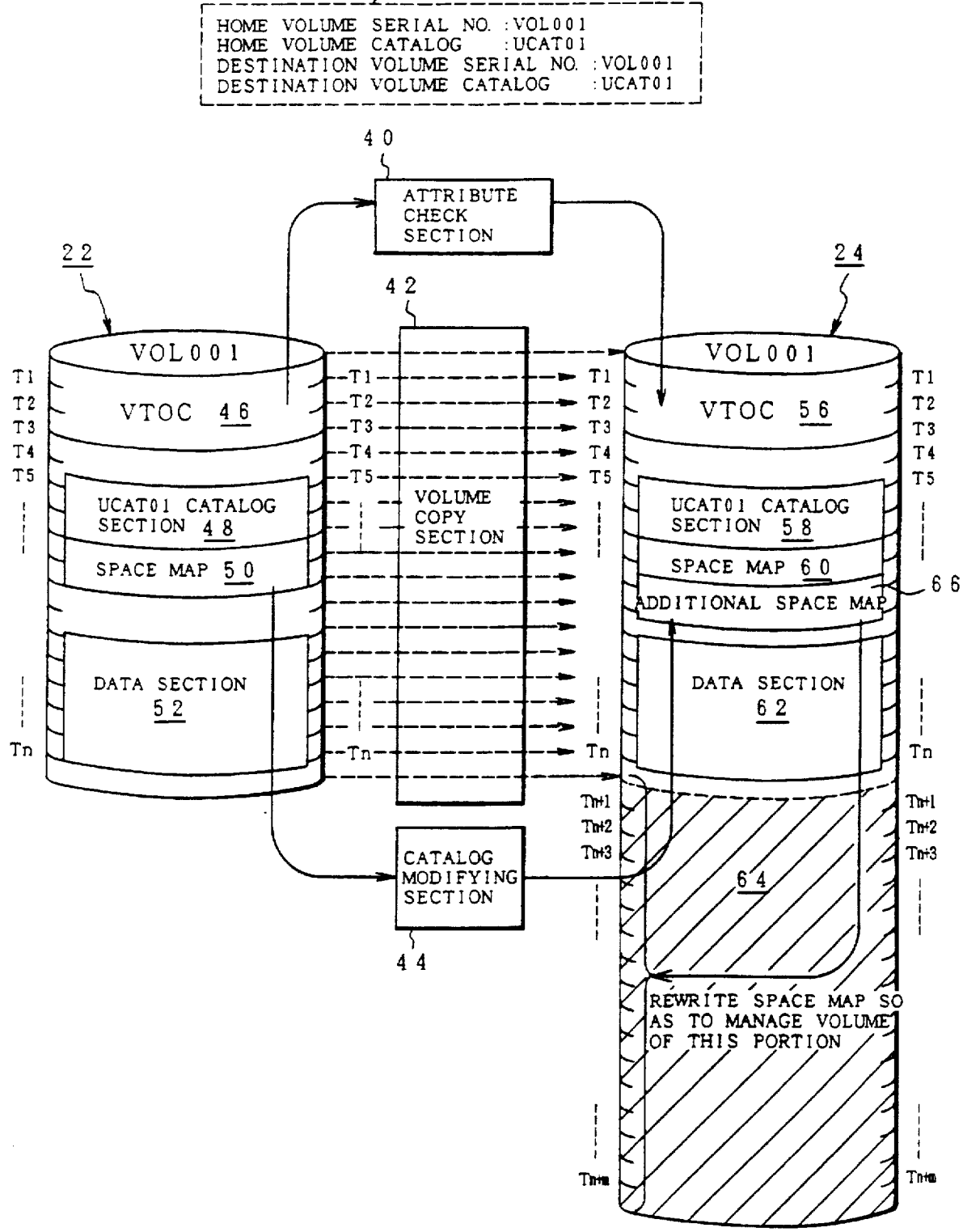
FIG. 6 is a descriptive view of details of processing in the present invention.

As shown by the operand 68 in FIG. 6, for example, a source volume serial number "VOL001," a source volume catalog name "UCAT01," a destination volume serial number "VOL001," and a destination volume catalog name "UCAT01" are specified. Then, at the step S2, the volume move command having the operands as specified at the step S1 is executed by the central processing unit 10, and the attribute check section 40, the volume copying section 42 and the catalog modifying section 44 shown in FIG. 2 perform respective functions. First, at the step S3, physical attributes of the source disk unit 22 and the destination disk unit 24 are checked up and the track capacities are fetched out from the physical attributes. At the step S4, the both disk units are compared in terms of the track capacity. If there is agreement, processing proceeds to the next step S5, determining that move processing is possible. The processing operations at the steps S3 and S4 represent the processing by the attribute check section 40 in FIG. 2. When the track capacities do not agree with each other at the step S4, on the other hand, move processing is not executable, and an error message is issued to the operator at the step 8, processing coming to an end in this case. When proceeding to the step S5 after determination of agreement of the track capacities at the step S4, the volume contents of the source dick unit 22 are dead-copied to the destination disk unit 24 for each track sequentially from the tracks T1 to Tn. This track-unit copying at the step S5 is repeated for all the tracks one by one until copying is completed for all the tracks of the source unit 22 at the step S6.

Figure 1:
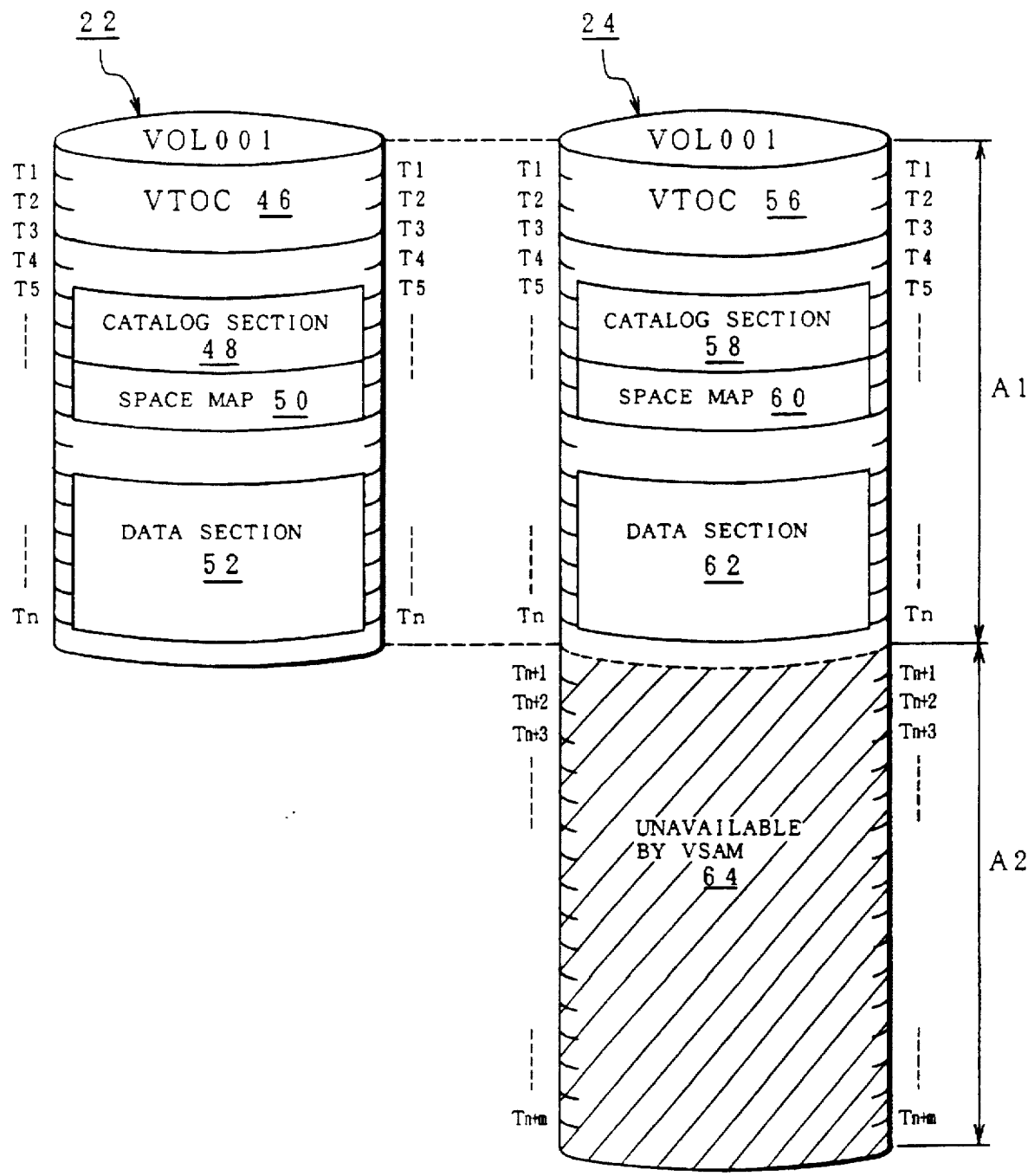
FIG. 1 is a descriptive view of a conventional disk unit carrying out file-unit transfer.

In actual volume copying between the disk units 22 and 24, the central processing unit 10 first issues a copying command to the disk controller 18 in FIG. 1. Upon receipt of the copying command, the disk controller 18 executes track-unit copying from the source disk unit 22 to the destination disk unit 24, and upon completion of copying, reports the result of processing to the central processing unit 10. In FIG. 1, both the source disk unit 22 and the destination disk unit 24 are connected to a device path from the disk controller 18, and consequently, read of the tracks of the disk unit 22 and write to the tracks of the disk unit 24 of the track data thus read would be repeated. When the source disk unit 22 and the destination disk unit 24 are connected to different disk controllers, track data are first read and sequentially sent to the disk controller of the source disk unit 22. Then, it suffices to transfer the data to the disk controller of the destination disk unit 24 and finally write the data for each track to the disk unit 24.

Referring again to FIG. 5, copying of the volume contents for each track shown at the steps S5 and S6 corresponds to the processing by the volume copying section 42 in FIG. 2. Upon completion of copying at the steps S5 and S6, the space map 60 copied to the catalog section 58 of the destination disk unit 24 is modified in compliance with the volume capacity of the destination at the step S7. In other words, in addition to the copied space map 60, a write operation is performed to prepare and add an additional space map 66 for the tracks Tn+1 to Tn+m contained in the increment area. This modification of the space map at the step S7 represents processing by the catalog modifying section 44 shown in FIG. 2.

Figure 7:
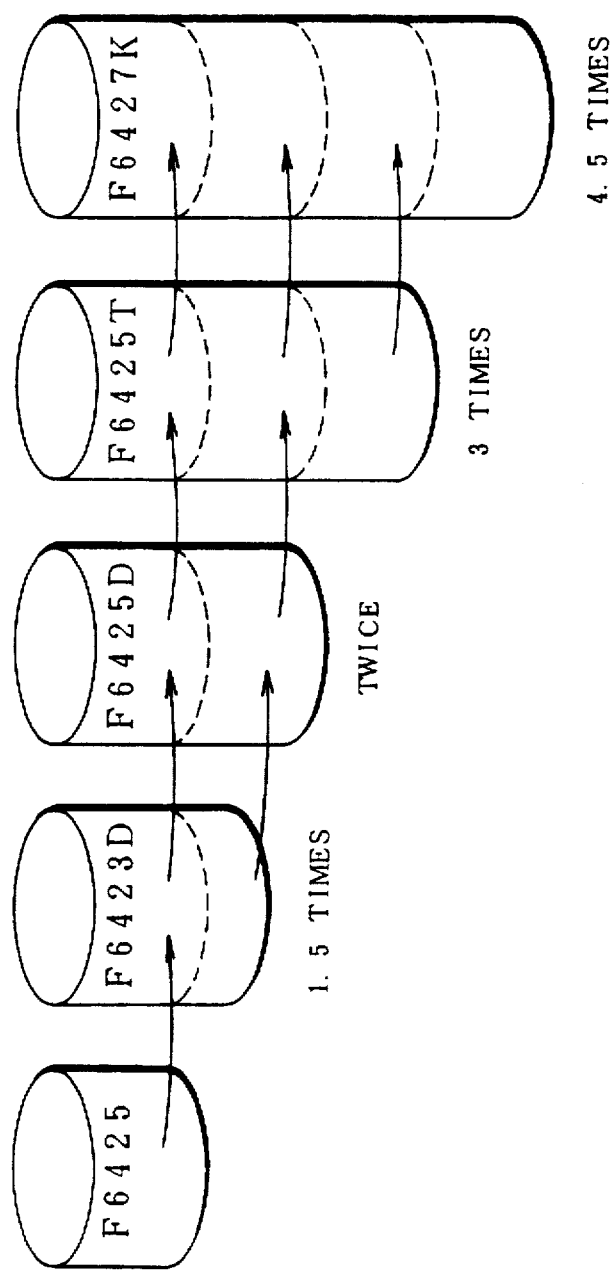
FIG. 7 is a descriptive view of a disk unit covered by processing in the present invention.

FIG. 7 shows a plurality of disk units of different models covered by the present invention. The disk unit 70 has a volume capacity of 630 MB, the disk unit 72, 950 MB, 1.5 times as large as that of the disk unit 70, the disk unit 74, 1,260 MB, twice as large as that of the disk unit 70, the disk unit 76, 1,890 MB, three times as large as that of the disk unit 70, and the disk unit 78, 2,835 MB, 4.5 times as large as that of the disk unit 70. As such disk units, F6425-series disk units manufactured by Fujitsu Limited are used. For example, the disk unit 70 is an F6425, the disk unit 72 is an F6425D, the disk unit 74 is an F6425D, the disk unit 76 is an F6425T, and the disk unit 78 is an F6425K, respectively.

Initially, a virtual storage resource is stored in the disk unit 70 having the smallest volume capacity. When increasing the capacity of the input/output subsystem, any of the disk units 71, 74, 76 and 78 having a larger capacity is connected. Then, the volume contents of the source disk unit 22 are copied for each volume by the application of the transfer processing of the present invention, and after copying, the space map of the catalog section is modified in compliance with the volume capacity at the destination, thus permitting management of the increment area as an area for storage of new virtual storage files.

According to the present invention, as described above, when expanding the scale of an input/output subsystem by replacing disk units, it is possible to transfer information for each volume even for disk units storing resources based on the virtual storage access method. As compared with the conventional file-unit transfer, it is possible to reduce man-hours and processing time, to prevent occurrence of operator's errors, and thus to efficiently perform modification of an existing input/output subsystem.

In the above-mentioned embodiments, magnetic disk units have been employed as direct access units, but the present invention is applicable with no modification also to optical disk units having a track-unit storage format. The present invention is not limited by the numerical values shown in the above-mentioned embodiments.

What is claimed is:

1. A processing apparatus including an existing first disk unit provided for an external storage system of a computer and a newly installed second disk unit of a larger storage capacity than said first disk unit, for transferring storage contents of said first disk unit to said second disk unit when said first and second disk units are installed, and after a completion of said transfer, for removing said first disk unit from the external storage system, thereby increasing a storage capacity of said external storage system, comprising:

a volume of virtual storage resources in which files subjected to input/output in accordance with a virtual storage access method by a higher-level device are stored into a data section of said first disk unit serving as a transfer source;

a space map to manage a number of tracks of the volume and provided in a catalog section of said first disk unit subsequent to a volume table of contents (VTOC) to manage said files;

an attribute check section which checks a track capacity among attribute information of said first disk unit, the source, and a track capacity among attribute information of the second disk unit, serving as a transfer destination, and determines whether or not the track capacities of the first and second disk units agree with each other;

a volume copying section which, upon receiving only one transfer process instruction from said higher-level device and when said attribute check section determines that the track capacities are in agreement, copies said space map and said volume of virtual storage resources as volume contents in the first disk unit, the source, as it is, to the subsequently provided second disk unit, the destination;

a catalog modifying section which, after a completion of the copying by said volume copying section, rewrites said space map copied to said second disk unit, the destination, in compliance with the track capacity of said second disk unit, the destination; and a command generating section of the higher-level device, which generates a volume shift processing command in a set-up process after said second disk unit is newly provided, activates each of said attribute check section, said volume copying section, and said catalog modifying section, and shifts the virtual storage resources of said first disk unit to said second disk unit on said volume unit basis.

2. A processing apparatus according to claim 1, wherein:

a source volume serial number and a source catalog name of said first disk unit, the source, and a destination volume serial number and a destination catalog name of said second disk unit, the destination, are specified by said command generating means in response to an operand of said volume shift processing command.

3. A processing apparatus according to claim 1, wherein:

said volume copying section causes said files and said catalog section to be copied, with a track as a unit, from said first disk unit, the source, to said second disk unit, the destination.

4. A processing method of increasing a storage capacity of an external storage system of a computer using disk units, comprising:

an expanding step of newly providing a second disk unit of a large storage capacity in addition to an existing first disk unit provided for said external storage system of said computer;

a move instructing step, issued from a higher-level device, of instructing a volume-unit transfer and an execution of files subjected to input/output in accordance with a virtual storage access method, a volume table of contents which controls said files and a catalog section including a space map controlling a number of tracks of the volume unit, from a first disk unit, which is a source of transfer, to a second disk unit, which is a destination of transfer, is provided subsequent to said first disk unit, and has a larger storage capacity than said first disk unit in a state in which said first and second disk units are installed;

an attribute checking step of checking up a track capacity among attribute information of the first disk unit, the source, and a track capacity among attribute information of the second disk unit, the destination, to determine whether or not the track capacities of the first and second disk units are in agreement;

a volume copying step of, upon receiving said instruction from said higher-level device and when the track capacities are determined to be in agreement with each other at said attribute checking step, copying the volume-unit and the space map stored in said first disk unit, the source, to said subsequently provided second disk unit, the destination;

a catalog modifying step of, after a completion of the copying at said volume copying step, rewriting said space map copied to the second disk unit, the destination, in compliance with the track capacity of said second disk unit, the destination; and a removing step of, after a completion of the rewriting of said space map at said catalog modifying step, removing said first disk unit, the source, from said external storage system, thereby constructing an external storage system in which a memory capacity is increased by said second disk unit newly provided.

5. A processing method according to claim 4, wherein:

said move instructing step, said attribute checking step, said volume copying step, and said catalog modifying step are executed as processing procedures of a volume move command of the higher-level device.

6. A processing method according to claim 5, wherein:

a source volume serial number and a source catalog name of said first disk unit, the source, and a destination volume number and a destination catalog name of said second disk unit, the destination, are specified in response to an operand of said volume move command.

7. A processing method according to claim 4, wherein:

said volume copying step causes said files and said catalog section to be copied, with a track as a unit, from said first disk unit, the source, to said second disk unit, the destination.

8. A processing apparatus for transferring virtual storage resources between disk units, comprising:

a source disk unit, provided for an external storage system of a computer, including a data section to store a volume of virtual storage resources having files subjected to input/output in accordance with a virtual storage access method by a higher-level device and including a space map to manage a number of tracks of said volume;

a destination disk unit, installed after said source disk unit is installed and having a larger storage capacity than said source disk unit, to receive storage contents transferred from said first disk unit when said first and second disk units are installed after which said first disk unit is removed from said external storage system to increase a storage capacity of said external storage system;

a volume copying section to copy said volume of virtual resources, as a unit, and said space map stored in said source disk unit to said destination disk unit; and a catalog modifying section to rewrite said space map copied to said destination disk unit based on a track capacity of said destination disk unit, after said volume copying section completes said copying of said volume to said destination disk unit.

9. A processing method for transferring virtual storage resources between disk units, comprising the steps of:

storing a volume of virtual storage resources having files subjected to input/output in accordance with a virtual storage access method by a higher-level device in a source disk unit;

subsequently providing a destination disk unit having a larger storage capacity than said source disk unit;

transferring storage contents of said first disk unit to said second disk unit when said first and second disk units are installed after which said first disk unit is removed from said external storage system to increase a storage capacity of said external storage system;

determining whether a track capacity of said source disk unit and a track capacity of said destination disk unit are equal to each other; and copying said volume of virtual storage resources, as a unit, stored in said source disk unit to said destination disk unit, upon receiving a transfer process instruction from said higher-level device and when said track capacities are determined to be equal to each other.

10. A processing method for transferring virtual storage resources between disk units, comprising the steps of:

storing a volume of virtual storage resources having files subjected to input/output in accordance with a virtual storage access method by a higher-level device in a data section of a source disk unit;

managing a number of tracks of said stored volume by a space map provided in said source disk unit;

subsequently providing a destination disk unit having a larger storage capacity than said source disk unit;

transferring storage contents of said first disk unit to said second disk unit when said first and second disk units are installed after which said first disk unit is removed from said external storage system to increase a storage capacity of said external storage system;

copying said volume of virtual storage resources, as a unit, and said space map stored in said source disk unit to said destination disk unit; and rewriting said space map copied to said destination disk unit based on a track capacity of said destination disk unit, after a completion of said copying of said volume to said destination disk unit.

* * * * *